No. 632,587. Patented Sept. 5, 1899.
A. RIEFFEL.
ACETYLENE GAS GENERATOR.
(Application filed Aug. 20, 1897.)
(No Model.)
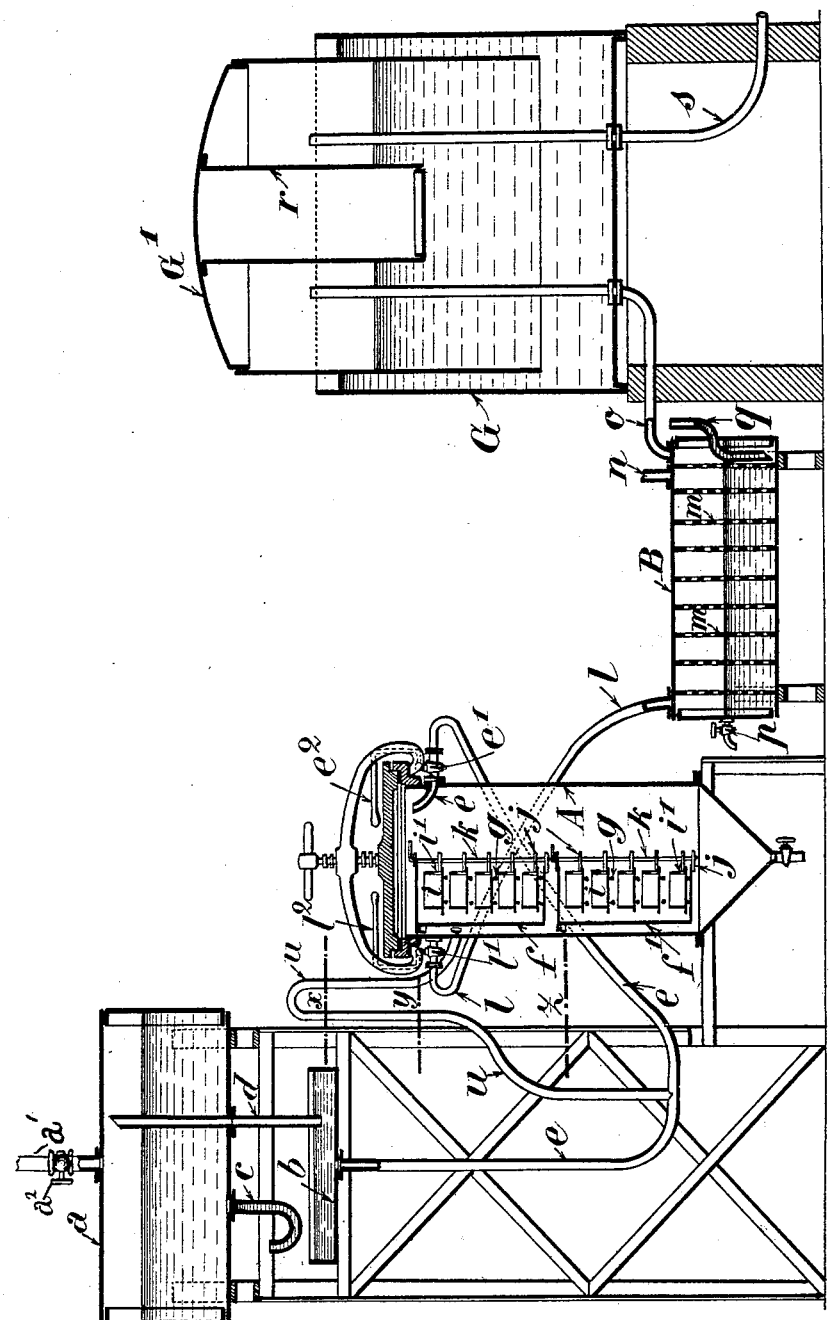
WITNESSES,
INVENTOR:
BY
ATTORNEYS

UNITED STATES PATENT OFFICE.

ARTHUR RIEFFEL, OF PARIS, FRANCE.

ACETYLENE-GAS GENERATOR.

SPECIFICATION forming part of Letters Patent No. 632,587, dated September 5, 1899.

Application filed August 20, 1897. Serial No. 648,971. (No model.)

*To all whom it may concern:*

Be it known that I, ARTHUR RIEFFEL, engineer, of No. 42 Boulevard Exelmans, Paris, in the Republic of France, have invented new Improvements in Apparatus for the Automatical Production of Acetylene, (for which I have obtained Letters Patent of France for fifteen years, No. 259,919, dated September 22, 1896;) and I do hereby declare that the following is a full and exact description thereof, reference being made to the accompanying drawing.

My invention relates to an apparatus for the automatical production of acetylene gas through the action of the water on the calcium carbid in which the column of feed-water for the gas-generating part of the apparatus is kept very much at the same height above the said generator and in which the said water is fed intermittently and automatically to the gas-generator, according to the consumption, by means of a device which relieves the bell-shaped top of the gasometer when it descends and weights it when ascending, so that the said top exercises on the gas a pressure which is inferior or superior to the load in the feed-water column.

The apparatus is composed of a water-tank from which the water intermittently overflows into a vessel from which starts the gas-generator feed-pipe of the said gas-generator, of a filtering and condensing device, and of a gasometer.

The invention will be fully described hereinafter and its novel features pointed out in the claim.

Reference is to be had to the accompanying drawing, which shows a gas-generator constructed according to my invention.

The tank $a$ is preferably a horizontal cylinder provided with two pipes $c$ and $d$ for the intermittent outflow of water and the intermittent inflow of air. The basin $b$, into which dips the pipe $d$, communicates with the gas-generator A by means of a bent pipe $e$, which first descends and then ascends to enter into the said generator toward its upper part, a cock $e'$ being provided for stopping all communication between the basin $b$ and the gas-generator A. $a'$ is a supply-pipe for charging the tank $a$, said supply-pipe having a cock $a^2$, whereby it may be closed to make the tank $a$ air-tight.

The gas-generator comprises, essentially, a vertical cylinder A, having a funnel-shaped bottom to facilitate the removal of dirt and a tight-closing top. In the cylinder A are placed supporting-frames $f f'$. The supporting-frames $f f'$ occupy about one-half the section of the gas-generator, and two or more frames are placed one above another as required. To the inner walls of the said frames are fixed horizontal rods $g$, which divide the frames into sections and form supports for trays $h$. On each tray $h$ is soldered a receiver $i$ for the calcium carbid, each receiver being partly open in front at $i'$ to allow the line to be removed. The frames $f f'$ and each of the trays $h$ carry a rigid and fixed ring $j$, and through all the rings is passed a vertical rod $k$ to keep the trays in vertical alinement.

Whatever may be the arrangement or the mode of construction of the generator the water comes into the same through a pipe $e$, falls to the bottom of the generator, and rises slowly in flooding the receivers $i$ and the carbid they contain.

The gas produced in the generator escapes through the pipe $l$, provided with a cock $l'$, and passes into a filtering and condensing device B, which comprises a horizontal tube or cylinder, in which are suitably arranged and fixed at proper intervals partitions or disks $m$, made either of open and fibrous fabric, such as coarse cloth, or of openly-woven asbestos. The cylinder B is half-filled with water through the opening $n$, which is then hermetically closed. The acetylene, coming through the pipe $l$, passes through the meshes, which are wet on account of the capillarity of the woven disks, is filtered, washed, and separated from the water-vapors carried along by it, and then passes through the pipe $o$ and under the bell-shaped top of the gasometer G. The filtering and condensing device B is also provided with a cock $p$ for carrying off the surplus of water coming from the condensation of the water-vapors carried forward by the acetylene, the opening of the said cock once or twice per month being sufficient. Were such opening to be neglected the water would run off of itself through the pipe $q$, open at both ends, one of which is under the water. The pressure in the gasometer and in the generator causes the water in the pipe $q$ to rise a few centimeters above the level of the water in the filtering and condensing device. If the said level becomes too high, the water flows out through the upper open end of the pipe $q$, so that the space left for the passage always remains sufficiently large.

The gasometer comprises a tank G and a vessel G', to the latter of which is fitted a device for varying its weight according to its descent or ascent in the tank G, and so as to make the weight of the vessel G' inferior to that of the load of water on the outlet-opening in the pipe $a$ into the generator when the said vessel is in its lowermost position and superior to that of the said load when the vessel is in its uppermost position. This device is shown as being a water-tight vessel $r$ fixed to the inner wall of the said bell-shaped top G' and in the center of the same, and which vessel $r$ dips into the water contained in the vessel G when the latter is in its lowermost position and is out of the water when the vessel G' is in its uppermost position.

The automatic acetylene-gas-producing apparatus comprises also two features of peculiar usefulness. The keys of the cocks $e'$ and $l'$, placed, respectively, in the feed-water pipe to the gas-generator and in the gas-pipe from the same, carry rods $e^2$ and $l^2$, bent over in such a way as to come above the lid of the generator when the corresponding cock is open. This arrangement is for the purpose of preventing the operator from leaving the cocks open when the generator is opened, it being thus necessary when taking off the lid to move aside the rods $e^2$ and $l^2$ and consequently to close the cocks $e'$ and $l'$. Furthermore, a safety-tube $u$ starts from a certain point in the generator and connects with the feed-water pipe $e$ at the lowest point thereof, said pipe extending upward above the level of the water in the tank $b$, so that water cannot enter the generator through the safety-pipe, and, further, in case the cocks $e'$ and $l'$ should be inadvertently closed when the apparatus is working the acetylene produced in the generator would find an outlet and escape to the atmosphere without any danger of the generator exploding. Normally, however, the pressure of gas is not sufficient to break the seal of the trap formed by the safety-pipe.

The operation is as follows: The water falls from the tank $a$ into the shallow vessel $b$ through the bent and narrow section-pipe $c$. Air comes and takes the place of the water in the tank $a$ in passing up the pipe $d$, which extends up to near the top of the said tank $a$, its lower end being a little below the edge of the vessel $b$. When the level of the water in the said vessel $b$ rises to a certain height, the orifice of the pipe $d$ becomes closed and as air cannot penetrate into the tank $a$ through the pipe $d$ the water stops falling through the pipe $c$, for the U-shaped tube $c$ prevents air from returning through the said tube $c$. The water contained in the shallow vessel or basin $b$ runs into the generator A through the pipe $e$ and gradually moistens and covers the carbid. Hence the level of the water falls in the vessel $b$, the lower orifice of the pipe $d$ becomes free, air rushes into it, and the water begins to fall again from the tank $a$ into the vessel $b$, and so on, so that the level of the water in the said vessel $b$ is subjected to but slight variations. The height of this level $x$ above the horizontal plane $y$, in which is placed the orifice of the pipe $e$ in the generator, represents the load or head of feed-water. The pipe $e$ is bent toward its lower part in order to prevent the water, in case of any increased pressure arising by the sudden giving off of acetylene gas, from being driven back sufficiently to allow the gas to escape through the said pipe $e$; and, indeed, if the pressure in the generator increases the level of the water toward the generator falls, say, from $y$ to $z$, and then the weight of the column of water which opposes the outflow of gas is represented by the height $x - y$ is increased by the height $y - z$. Therefore as the pressure increases in the generator the height of the column of water which is to prevent the outflow of gas increases to the same extent. The weight of the bell-shaped top G' of the gasometer is so calculated as to exert on the gas a greater pressure than the column of water $x - y$; but as the vessel $r$, fixed to the said top, is partly under water it receives from the liquid an upthrust, which tends to move the lid G' up and to decrease its weight, so that it weighs less on the gas than the column of water $x - y$. Therefore the water runs into the generator and the gas in the generator runs into the gasometer; but the lid G' continues to rise on account of the arrival of the gas, which is produced in the generator through the action of the water on the calcium carbid. The vessel $r$ comes little by little out of the water and ceases to decrease the weight of the bell-shaped top G'. As the latter then exerts on the gas a pressure which is greater than the column of water $x - y$, the water ceases to run and the production of acetylene stops. If the gas is carried off from the vessel G' through the outlet-pipe S, the vessel or top G' moves down and the vessel $r$, coming again partly under water, again decreases the weight of the said bell-shaped top. As the latter now weighs less than the column of water $x - y$, the water runs into the generator A and the production of gas again begins.

In the arrangement shown the top G' has of itself a weight which is greater than that of the column of water $x - y$, and the devices applied to it serve to decrease its weight when it moves down and allow it to take its weights again when moving up. Therefore the gas-producing apparatus is in reality a balance in which the weight of the bell-shaped top G' is alternately superior or inferior to the load of water in the feed-column, according to the uppermost or lowermost position occupied by the said top, the result being that the water is either stopped at the orifice of the pipe $e$ or runs through the said orifice into the generator according to the amount of gas in the generator, so that the production of gas is stopped or the apparatus is put automatically in operation, according to the wants of consumption and without any supervision being necessary.

I claim—

The combination of the gas-generator, the supply vessel, the supply-pipe leading from said vessel to the upper part of the generator, and a safety-pipe leading from the gas-generator to a point of the said supply-pipe between the generator and the said vessel, substantially as described.

In witness whereof I have hereunto set my hand in presence of two witnesses.

ARTHUR RIEFFEL.

Witnesses:
GEO. LAURENT,
EUGENE WALLIER.